United States Patent [19]
Hannah

[11] 3,901,914
[45] Aug. 26, 1975

[54] 1-[SUBSTITUTED PHOSPHINOTHIOYL, PHOSPHINYL OR PHOSPHINO]-SUBSTITUTED INDOLE-3-ACETIC ACIDS

[75] Inventor: John Hannah, Matawan, N.J.
[73] Assignee: Merck & Co., Inc., Rahway, N.J.
[22] Filed: Nov. 1, 1973
[21] Appl. No.: 411,856

[52] U.S. Cl. ............ 260/326.12 R; 260/326.13 R; 260/326.14 R; 260/268 TR; 260/247.1 B; 260/247.2 R; 260/247.2 B; 260/268 BC; 424/200
[51] Int. Cl.² ............ C07D 209/18; C07D 209/20; A61K 31/675
[58] Field of Search .......... 260/326.13 R, 326.12 R Primary Examiner—Elbert L. Roberts
Assistant Examiner—S. P. Williams
Attorney, Agent, or Firm—Harry E. Westlake, Jr.; William H. Nicholson

[57] ABSTRACT

Novel 1-[substituted phosphinothioyl, phosphinyl or phosphino]-substituted indole 3-acetic acids and processes for preparing the same. The 1-[substituted phosphinothioyl, phosphinyl or phosphino]-substituted-indole-3-acetic acids disclosed herein are potent anti-inflammatory, anti-pyretic and analgesic agents. Also included herein are pharmaceutical compositions containing said 1-[substituted phosphinothioyl, phosphinyl or phosphino]-substituted-indole-3-acetic acid compounds as an active ingredient, and methods of treating inflammation, fever and pain in patients by administering said compounds.

6 Claims, No Drawings

1-[SUBSTITUTED PHOSPHINOTHIOYL, PHOSPHINYL OR PHOSPHINO]-SUBSTITUTED INDOLE-3-ACETIC ACIDS

This invention relates to novel 1-[substituted phosphinothioyl, phosphinyl or phosphino]-substituted indole-3-acetic acids and processes for preparing the same. Also included within the scope of the invention are pharmaceutical compositions containing said 1-[substituted phosphinothioyl, phosphinyl or phosphino]-substituted indole-3-acetic acid compounds as an active ingredient. The novel 1-[substituted phosphinothioyl, phosphinyl or phosphino]-substituted indole-3-acetic acids of the invention are potent anti-inflammatory, anti-pyretic and analgesic agents which are effective in the method of counteracting inflammation, pain and fever.

In the past, numerous compounds have been widely used in the treatment of inflammation, pain and fever. The compounds employed in said treatment have consisted of both steroids and non-steroids. These compounds have shown side effects ranging from a simple headache to psychic and gastrointestinal disturbances.

In a continuous search for potent anti-inflammatory, anti-pyretic and analgesic agents, we have found a class of novel 1-[substituted phosphinothioyl, phosphinyl or phosphino]-substituted indole-3-acetic acids which are highly effective in the treatment of inflammation, pain and fever. The novel 1-[substituted phosphinothioyl, phosphinyl or phosphino]-substituted indole-3-acetic acids are of value in the treatment of arthritic and dermatological disorders of like conditions responsive to anti-inflammatory drugs. In general they are indicated for a wide variety of conditions where one or more of the symptoms of inflammation, fever and pain are mainfested. Included within this category are diseases such as rheumatoid arthritis, osteoarthritis, gout, infectious arthritis and rheumatic fever. As indicated above the compounds utilized in the practice of the invention also possess a useful degree of analgesic and anti-pyretic acitivity.

The novel 1-[substituted phosphinothioyl, phosphinyl or phosphino]-substituted indole-3-acetic acid compounds of the invention are represented by the general structure I below:

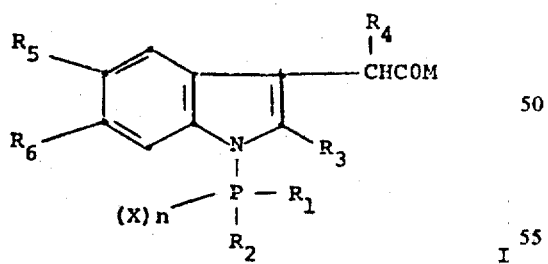

wherein
$R_1$ and $R_2$ are each
  alkoxy having a maximum of six carbon atoms such as
    methoxy,
    ethoxy,
    isopropyloxy,
    butoxy and the like,
  alkyl having a maximum of six carbon atoms such as
    methyl,
    propyl,
    ethyl,
    t-butyl and the like,
  alkylamino having a maximum of six carbon atoms such as
    methylamino,
    dimethylamino,
    butylamino,
    diethylamino,
    methylethylamino and the like,
  alkenylamino having a maximum of six carbon atoms such as
    dibutenylamino,
    propenylamino,
    dipentenylamino,
    diethenylamino,
    dipropenylamino and the like,
  arylamino having a maximum of eight carbon atoms such as
    anilino,
    o,m or p-tolylamino,
    anisidino and the like,
  OA wherein A is a cation such as
    sodium,
    potassium,
    calcium,
    lithium,
    magnesium and the like,
  haloaryl having a maximum of eight carbon atoms such as
    chlorophenyl,
    chloromethylphenyl,
    fluorophenyl,
    bromophenyl, and the like,
  haloaralkyl having a maximum of eight carbon atoms such as
    o,m or p-chlorobenzyl,
    o,m or p-fluorobenzyl
    o,m or p-bromobenzyl and the like,
  aryloxy having a maximum of eight carbon atoms such as
    phenoxy,
    o,m or p-halophenoxy,
    o,m or p-tolyloxy,
    o,m or p-methoxyphenoxy and the like or
  aralkyloxy having a maximum of nine carbon atoms such as
    benzyloxy,
    phenethyloxy,
    o,m or p-methoxybenzyloxy,
    o,m or p-methylbenzyloxy and the like;
$R_3$ is
  hydrogen or
  alkyl having a maximum of six carbon atoms such as
    methyl,
    ethyl,
    isopropyl,
    butyl, and the like;
$R_4$ is
  hydrogen or
  alkyl having a maximum of six carbon atoms such as
    methyl,
    ethyl,
    propyl, butyl, and the like;
$R_5$ is
  hydrogen,
  alkyl having a maximum of six carbon atoms such as
    methyl,
    ethyl,
    propyl,
    butyl, and the like,
  alkoxy having a maximum of six carbon atoms such as
    methoxy,
    ethoxy,
    butoxy,
    isopropoxy, and the like,
  nitro,
  alkylamino having a maximum of six carbon atoms such as
    ethylamino,
    dimethylamino,
    propylamino,
    diethylamino,
    methylethylamino,
    butylamino,
    diisopropylamino, and the like,
  alkanoyl having a maximum of four carbon atoms such as
    acetyl,
    propionyl,
    butyryl, and the like,
  N-azepino,
  N-pyrrolidino,
  4-methyl-1-piperazinyl,
  N-morpholino,
  cyano,
  halogen, such as,
    chlorine,
    fluorine,
    bromine, and the like or
  alkenyl having a maximum of six carbon atoms such as
    vinyl,
    allyl,
    propenyl,
    butenyl, and the like;
$R_6$ is
  hydrogen,
  halogen, such as,
    chlorine,
    fluorine,
    bromine, and the like
  alkoxy having a maximum of six carbon atoms such as,
    methoxy,
    ethoxy,
    isopropoxy,
    butoxy, and the like or
  alkyl having a maximum of six carbon atoms such as,
    methyl,
    ethyl,
    isopropyl,
    butyl, and the like;
X is
  oxygen or sulfur;
$n$ is
  an integer equal to 0 or 1; and M is
  hydroxy,
  alkoxy having a maximum of six carbon atoms such as,
    methoxy,
    ethoxy,
    t-butoxy and the like,
  aralkyloxy having a maximum of nine carbon atoms such as,
    benzyloxy,
    o,m or p-methylbenzyloxy,
    o,m or p-methoxybenzyloxy, and the like or
  OZ where Z is a cation, such as,
    sodium,
    potassium,
    aluminum,
    magnesium,
    barium,
    calcium, and the like.

The preferred compounds of this invention are those compounds represented by the above general structure wherein $R_1$ and $R_2$ are selected from the group consisting of alkoxy, alkylamino, OA wherein A is a cation, arylamino, haloaryl and haloaralkyl; $R_3$ is alkyl; $R_4$ is hydrogen; $R_5$ is selected from the group consisting of alkoxy, alkylamino, N-azepino, N-pyrrolidino, 4-methyl-1-piperazinyl, N-morpholino, cyano and halogen; $R_6$ is hydrogen; X is oxygen; $n$ is 1; and M is selected from the group consisting of hydroxy and alkoxy. The most preferred compounds of this invention are represented wherein $R_1$ and $R_2$ are selected from the group consisting of alkoxy, OA wherein A is a cation, haloaryl and haloaralkyl; $R_3$ is alkyl; $R_4$ is hydrogen; $R_5$ is alkoxy, alkylamino, halogen and N-pyrrolidino; $R_6$ is hydrogen; X is oxygen; $n$ is 1; and M is hydroxy.

The pharmaceutically acceptable salts of the compounds disclosed herein are to be considered within the scope of the invention. Representative examples of said pharmaceutically acceptable salts are alkali metals such as sodium, potassium, and the like, and alkaline earth metals such as barium, calcium, magnesium, and the like.

This invention may be better understood from the details shown below.

The novel compounds of the invention are prepared by employing 2,5-disubstituted-indole-3-acetic acid and derivatives thereof (A) as the starting material wherein $R_3$, $R_4$, $R_5$, and $R_6$ are as defined above and M is other than hydroxy. The anion of starting material (A) is treated with a substituted phosphonic chloride reagent (B) wherein $R_1$ and $R_2$ are as defined above to obtain compound (E), 1-[substituted phosphinyl]-2,5-disubstituted-indole-3-acetic acid or derivative thereof wherein n is 1 and X is oxygen. To obtain the novel 1-[substituted phosphino]-2,5-disbustituted-indole-3-acetic acid compounds or derivatives thereof (E), the anion of starting material (A) is treated with a substituted phosphonous chloride reagent (C). The novel 1-[substituted phosphinothioyl]-2,5-disubstituted-indole-3-acetic acid compounds or derivatives thereof (E) wherein n is 1 and X is sulfur, are obtained by treating the anion of starting material (A), 2,5-disubstituted-indole-3-acetic acid or derivative thereof with a substituted phosphinothioyl reagent (D). When $R_1$ or $R_2$ in compound (E) is other than OA wherein A is a cation, said compound (E) is then treated with an aqueous base (alkali, alkaline and etc.)

to obtain the mono or di-phosphate salt of the corresponding indole-3-acetic acid derivative. Flow Sheet I below represents the general reaction sequence for the preparation of the novel compounds of this invention.
Flow Sheet I
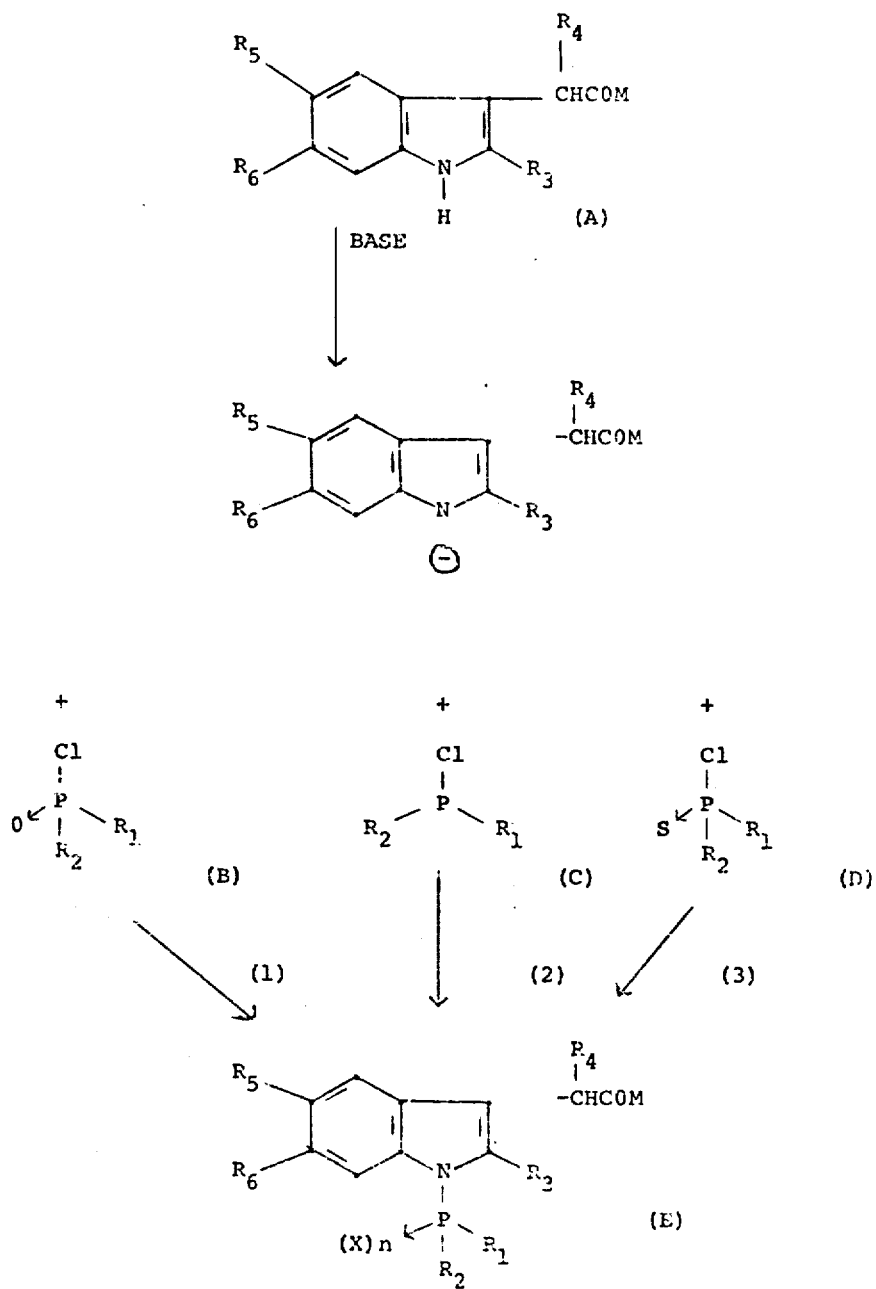

Reactions and Conditions

Steps 1–3:

The reaction is performed in presence of a base such as sodium amide, sodium hydride, phenyl-lithium, tri-phenylmethylsodium, butyl lithium, methyllithium, lithium, diisoproxhylamide, with a substituted phosphonic chloride, substituted phosphonous chloride or substituted phosphinothioyl chloride reagent (see Flow Sheet I compounds B, C & D respectively) in an inert solvent such as benzene, toluene, dimethylformamide, tetrahydrofuran, dioxane, ether, dimethylsulfoxide, xylene, and the like, at temperatures ranging from about 0°C. to 50°C. Of particular preference is the combination of sodium hydride and dimethylformamide at temperatures ranging from about 30°C. to 45°C. under a atmosphere of nitrogen.

Representative compounds of this invention are as follow:

1-[4'-chlorophenyl (ethoxy) phosphinyl]-2-methyl-5-methoxyindolyl-3-acetic acid

1-[4'-chlorophenyl (ethoxy) phosphinyl]-2-methyl-5-methoxy-6-chloro-indolyl-3-acetic acid 1-[4'-chlorophenyl (ethoxy) phosphinyl]-2-methyl-5-methylindolyl-3-acetic acid 1-[4'-chlorophenyl (ethoxy) phosphinyl]-2-methyl-5-nitroindolyl-3-acetic acid 1-[methyl-4-methylthiophenyl phosphinyl]-2-methyl-5-methoxyindolyl-3-acetic acid 1-[4'-chlorophenyl (ethoxy) phosphinyl]-2-methyl-5-dimethylaminoindolyl-3-acetic acid 1-[N,N-diethylamino (ethoxy) phosphinyl]-2-methyl-5-dimethylaminoindolyl-3-acetic acid 1-[4'-chlorophenyl (ethoxy) phosphinyl]-2-methyl-5-[1-pyrrolidino)indolyl-3-acetic acid 1-[4'-chlorophenyl (ethoxy) phosphinyl]-2-methyl-5-fluoroindolyl-3-acetic acid 1-[4'-chlorophenyl (ethoxy) phosphinyl]-2-methyl-5-acetylindolyl-3-acetic acid 1-[4'-chlorophenyl (ethoxy) phosphinyl]-2-methyl-5-cyanoindolyl-3-acetic acid 1-[4'-chlorophenyl (ethoxy) phosphinyl]-2-methyl-5-propenylindolyl-3-acetic acid 1-[4'-chlorophenyl (ethoxy) phosphino]-2-methyl-5-methylindolyl-3-acetic acid 1-[4'-chlorophenyl (ethoxy) phosphino]-2-methyl-5-nitroindolyl-3-acetic acid 1-[di-isopropoxy phosphino]-2-methyl-5-nitroindolyl-3-acetic acid 1-[4'-chlorophenyl (ethoxy) phosphino]-2-methyl-5-dimethylaminoindolyl-3-acetic acid 1-[4'-chlorophenyl (ethoxy) phosphino]-2-methyl-5-(1-pyrrolidino)indolyl-3-acetic acid 1-[4'-chlorophenyl (ethoxy) phosphino]-2-methyl-5-fluoroindolyl-3-acetic acid 1-[4'-chlorophenyl (ethoxy) phosphino]-2-methyl-5-acetylindolyl-3-acetic acid 1-[4'-chlorophenyl (ethoxy) phosphino]-2-methyl-5-propenylindolyl-3-acetic acid 1-[4'-chlorophenyl (ethoxy) phosphinothioyl]-2-methyl-5-methoxyindolyl-3-acetic acid 1-[4'-chlorophenyl (ethoxy) phosphinothioyl]-2-methyl-5-nitroindolyl-3-acetic acid 1-[4-methylthiophenyl (ethoxy) phosphinothioyl]-2-methyl-5-nitroindolyl-3-acetic acid 1-[4'-chlorophenyl (ethoxy) phosphinothioyl]-2-methyl-5-dimethylaminoindolyl-3-acetic acid 1-[0-ethyl-N,N,-diethylamino-phosphinothioyl]-2-methyl-5-dimethylaminoindolyl-3-acetic acid 1-[4'-chlorophenyl (ethoxy) phosphinothioyl]-2-methyl-5-(1-pyrrolidino) indolyl-3-acetic acid 1-[4'-chlorophenyl (ethoxy) phosphinothioyl]-2-methyl-5-fluoroindolyl-3-acetic acid 1-[4'-chlorophenyl (ethoxy) phosphinothioyl]-2-methyl-5-acetylindolyl-3-acetic acid 1-[4'-chlorophenyl (ethoxy) phosphinothioyl]-2-methyl-5-cyanoindolyl-3-acetic acid 1-[4'-chlorophenyl (ethoxy) phosphinothioyl]-2-methyl-5-propenylindolyl-3-acetic acid 1-[3'-chlorophenyl (ethoxy) phosphinyl]-2-methyl-5-methoxyindolyl-3-acetic acid 1-[ethoxy (hydroxy) phosphinyl]-2-methyl-5-methoxyindolyl-3-acetic acid disodium salt 1-[ethoxy (hydroxy) phosphinyl]-2-methyl-5-dimethylaminoindolyl-3-acetic acid disodium salt 1-[ethoxy (hydroxy) phosphinyl]-2-methyl-5-(1-pyrrolidino)-indolyl-3-acetic acid disodium salt 1-[ethoxy (hydroxy) phosphinyl]-2-methyl-5-fluoroindolyl-3-acetic acid disodium salt 1-[ethoxy (hydroxy) phosphinyl]-2-methyl-5-propenylindolyl-3-acetic acid disodium salt 1-[ethoxy (hydroxy) phosphinyl]-2-ethyl-5-methoxyindolyl-3-acetic acid disodium salt 1-[ethoxy (hydroxy) phosphino]-2-methyl-5-methoxyindolyl-3-acetic acid disodium salt 1-[ethoxy (hydroxy) phosphino]-2-methyl-5-dimethylaminoindolyl-3-acetic acid disodium salt 1-[ethoxy (hydroxy) phosphino]-2-methyl-5-(1-pyrrolidino) indolyl-3-acetic acid disodium salt 1-[ethoxy (hydroxy) phosphino]-2-methyl-5-fluoroindolyl-3-acetic acid disodium salt 1-[ethoxy (hydroxy) phosphino]-2-methyl-5-propenylindolyl-3-acetic acid disodium salt 1-[ethoxy (hydroxy) phosphino]-2-ethyl-5-methoxyindolyl-3-acetic acid disodium salt 1-[ethoxy (hydroxy) phosphinothioyl]-2-methyl-5-methoxyindolyl-3-acetic acid disodium salt 1-[ethoxy (hydroxy) phosphinothioyl]-2-methyl-5-dimethylaminoindolyl-3-acetic acid disodium salt 1-[ethoxy (hydroxy) phosphinothioyl]-2-methyl-5-(1-pyrrolidino) indolyl-3-acetic acid disodium salt 1-[ethoxy (hydroxy) phosphinothioyl]-2-methyl-5-fluoroindolyl-3-acetic acid disodium salt 1-[ethoxy (hydroxy) phosphinothioyl]-2-methyl-5-propenylindolyl-3-acetic acid disodium salt 1-[ethoxy (hydroxy) phosphinothioyl]-2-ethyl-5-methoxyindolyl-3-acetic acid sodium salt 1-[4'-chlorophenyl (hydroxy) phosphinyl]-2-methyl-5-methylindolyl-3-acetic acid sodium salt and 1-[4'-chlorophenyl (hydroxy) phosphinothioyl]-2-methylindolyl-3-acetic acid sodium salt The compounds of this invention are administered orally, topically, intravenously, or intramuscularly as a phosphate salt in the treatment of inflammation, fever and pain. Of particular preference is the oral form ranging from 1 to 2,000 mg./kg. of body weight per day. Of preference is 10–500 mg./kg. of body weight per day for varying periods of treatment as required. Comparable amounts of the compounds may be administered in topical or parenteral forms.

For these purposes the compounds of the invention may be administered orally, topically, and parenterally in dosage unit formulations containing conventional non-toxic pharmaceutically acceptable carriers, adjuvants and vehicles. The term "parenteral" as used herein includes intravenous or intramuscular. In addition to the treatment of warm-blooded animals such as mice, rats, horses, dogs cats, etc., the compounds of the invention are effective in the treatment of humans.

The pharmaceutical compositions containing the active ingredients may be in a form suitable for oral use, for example, as tablets, troches, lozenges, aqueous or oil suspensions, dispersible powders or granules, emulsions, hard or soft capsules, syrups or elixirs. Compositions intended for oral use may be prepared according to any method known to the art for the manufacture of pharmaceutical compositions and such compositions may contain one or more agents selected from the group consisting of sweetening agents, flavoring agents, coloring agents and preserving agents in order to provide a pharmaceutically elegant and palatable preparation. Tablets contain the active ingredient in admixture with non-toxic pharmaceutically acceptable excipients which are suitable for manufacture of tablets. These excipients may be, for example, inert diluents such as calcium carbonate, sodium carbonate, lactose, calcium phosphate or sodium phosphate; granulating and disintergrating agents, for example, maize starch or alginic acid; binding agents, for example, starch, gelatin or acacia; and lubricating agents, for example, magnesium stearate, stearic acid or talc. The tablets may be uncoated or they may be coated by known techniques to delay disintegration and absorption in the gastrointestinal tract and thereby provide a sustained action over a longer period. For example, a time delay material such as glyceryl monosterate or glyceryl distearate alone or with a wax may be employed.

Formulations for oral use may also be presented as hard gelatin capsules wherein the active ingredient is mixed with an inert solid diluent, for example, calcium carbonate, calcium phosphate or kaolin, or as soft gelatin capsules wherein the active ingredient is mixed with water or an oil medium, for example arachis oil, peanut oil, liquid paraffin or olive oil.

Aqueous suspensions contain the active materials in admixture with excipients suitable for the manufacture of aqueous suspensions. Such excipients are suspending agent, for example, sodium carboxymethylcellulose, methylcellulose, hydroxypropylmethylcellulose, sodium alginate, polyvinylpyrrolidone, gum tragacanth and gum acacia; dispersing or wetting agents may be a naturally-occurring phosphatide, for example, lecithin, or condensation products of an alkylene oxide with fatty acids, for example, polyoxyethylene stearate, or condensation products of ethylene oxide with long chain aliphatic alcohols, for example, heptadecaethyleneoxycetanol, or condensation products of ethylene oxide with partial esters derived from fatty acids and a hexitol such as polyoxyethylene sorbitol monooleate, or condensation products of ethylene oxide with partial esters derived from fatty acids and hexitol anhydrides, for example, polyoxyethylene sorbitan monooleate. The said aqueous suspensions may also contain one or more preservatives, for example, ethyl or n-propyl p-hydroxy benzoate, one or more coloring agents, one or more flavoring agents and one or more sweetening agents, such as sucrose or saccharin.

Oily suspensions may be formulated by suspending the active ingredient in a vegetable oil, for example, arachis oil, olive oil, sesame oil, or coconut oil, or in a mineral oil such as liquid paraffin. The oil suspensions may contain a thickening agent, for example, beeswax, hard paraffin or cetyl alcohol. Sweetening agents, such as those set forth above, and flavoring agents may be added to provide a palatable oral preparation. These compositions may be preserved by the addition of an anti-oxidant such as ascorbic acid.

Dispersible powders and granules suitable for preparation of an aqueous suspension by the addition of water provide the active ingredient in admixture with a dispersing or wetting agent, suspending agent and one or more preservatives. Suitable dispersing or wetting agents and suspending agents are exemplified by those already mentioned above. Additional excipients, for example, sweetening, flavoring and coloring agents, may also be present.

The pharmaceutical compositions of the invention may also be in the form of oil-in-water emulsions. The oily phase may be a vegetable oil, for example, olive oil or arachis oils, or a mineral oil, for example, liquid paraffin or mixtures of these. Suitable emulsifying agents may be naturally-occurring gums, for example, gum acacia or gum tragacanth, naturally-occurring phosphatides, for example, soya bean, lecithin, and esters or partial esters derived from fatty acids and hexitol anhydrides, for example, sorbitan mono-oleate, and condensation products of said partial esters with ethylene oxide, for example, polyoxyethylene sorbitan monooleate. The emulsions may also contain sweetening and flavoring agents.

Syrups and elixirs may be formulated with sweetening agents, for example, glycerol, sorbitol or sucrose. Such formulations may also contain a demulcent, a preservative and flavoring and coloring agents.

For intravenous and intramuscular administrations, the pharmaceutical compositions may be in the form of a sterile injectable preparation, for example, as a sterile injectable aqueous or oleagenous suspension. This suspension may be formulated according to the known art using those suitable dispersing or wetting agents and suspending agents which have been mentioned above. The sterile injectable preparation may also be a sterile injectable solution or suspension in a non-toxic parenterally-acceptable diluent or solvent, for example, as a solution in 1,3-butane diol. Among the acceptable vehicles and solvents that may be employed are water, Ringer's solution, and isotonic sodium chloride solution. In addition, sterile, fixed oils are conventionally employed as a solvent or suspending medium. For this purpose, any bland fixed oil may be employed including synthetic mono- or di-glycerides. In addition, fatty acids such as oleic acid find use in the preparation of injectables.

The amount of active ingredients that may be combined with the carrier materials to produce a single dosage form will vary depending upon the host treated and the particular mode of administration. For example, a formulation intended for the oral administration of humans may contain from 5 mg. to 10 grams of active agent compounded with an appropriate and convenient amount of carrier material which may vary from about 5 to about 95 percent of the total composition. Dosage unit forms will generally contain between from about 175 mg. to about 1.75 g. of the active ingredient. Comarable amounts of the compounds may be administered in topical or parenteral forms.

It will be understood, however, that the specific dose level for any particular patient will depend upon a variety of factors including the activity of the specific compound employed, the age, body weight, general health, sex, diet, time of administration, route of administration, rate of excretion, drug combination and the severity of the particular disease undergoing therapy.

The starting materials employed in the invention are ,5-disubstituted-indole-3-acetic acid, substituted phosphonic chloride, substituted phosphonous chloride and substituted phosphinothioyl chloride which are shown in Flow Sheet I as compounds A, B, C and D, respectively. Starting material (A) is known and processes for its preparation can be found in the literature. For example, see U.S. Patent No. 3,161,654. Also starting materials (B,C, and D) and known and processes for its preparation can be found in the literature. For example, see HoubenWeyl 12–1, 307 and 368–393 (1963); Houben-Weyl 12–2, 98, 280–291, 386 and 405–447 (1964); and Monatshefte Fur Chemie, 96, 936–42 (1965).

The following examples illustrate the preparation of the various 1-[substituted phosphino, phosphinyl or phosphinothioyl]-indole-3-acetic acid and derivative thereof described herein as anti-inflammatory, antipyretic and analgesic agents. The examples should be construed as an illustration of the invention rather than limitation thereof.

EXAMPLE 1

2-Fluorophenyl phosphonic dichloride

2-Fluorophenyl phosphonic acid (17.6 g, 0.1 mole) intimately mixed with phosphonous pentachloride (43.8 g, 0.21 mole) with care to exclude moisture. A vigorous reaction is initiated by careful warming of the mixture. After the resulting reaction has ceased, the mixture is heated to 80° until a clear solution is obtained. Fractional distillation removes the phosphorous oxychloride formed and yields 2-fluorophenyl-phosphonic dichloride.

EXAMPLE 2

Ethyl 2-fluorophenylphosphonochloridate

To a solution of 2-fluorophenylphosphonic dichloride (22.2 g, 0.1 mole) in dry benzene (100 ml) is added drop wise with agitation a solution containing ethanol (4.61 g, 0.1 mole) with pyridine (7.91 g, 0.1 mole) in 20 ml. of benzene. The resulting mixture is heated to reflux for 30 minutes in order to complete the reaction. This mixture is then cooled to room temperature, filtered and the filtrate is evaporated to obtain ethyl 2-fluorophenyl-phosphonochloridate.

When methanol, propanol, isopropanol, phenol or benzyl alcohol is substituted for ethanol, there is obtained methyl, propyl, isopropyl, phenyl or benzyl 2-fluorophenylphosphonochloridate.

EXAMPLE 3

Ethyl 4-chlorophenylphosphonochloridate

To a solution of 4-chlorophenylphosphonic dichloride (19.85 g, 0.1 mole) in dry benzene (100 ml) is added drop wise with agitation a solution of ethanol (4.61 g, 0.1 mole) and pyridine (7.91 g, 0.1 mole) in ml. of benzene. The mixture is heated to reflux and maintained for 30 minutes to complete the reaction. Said mixture is then cooled to room temperature, filtered and the filtrate evaporated at 50°/0.1 mm. to obtain ethyl 4-chlorophenylphosphonochloridate.

When methanol, propanol, isopropanol, phenol or benzyl alcohol is substituted for ethanol, there is obtained methyl, propyl, isopropyl, phenyl, or benzyl 4-chlorophenylphosphonochloridate.

EXAMPLE 4

Isopropyl 4-chlorophenylphosphonochloridite

To a solution of 4-chlorophenylphosphonous dichloride (18.25 g, 0.1 mole) in hexane (100 ml) at 0° in a dry nitrogen atmosphere is added dropwise with agitation a solution of isopropanol (6.01 g, 0.1 mole) and N,N diethylamine (14.92 g 0.1 mole) in 20 ml of hexane. This mixture is allowed to warm to room temperature within approximately an hour period and the filtrate evaporated at reduced pressure. Fractional distillation of the residue at reduced pressure yields isopropyl 4-chlorophenylphosphonochloridite.

When ethanol, butanol, phenol or benzyl alcohol is substituted for isopropanol, there is obtained the corresponding ethyl, butyl, phenyl or benzyl 4-chlorophenylphosphonochloridite.

EXAMPLE 5

Ethyl 4-chlorophenyl phosphorochloridite

To a solution of ethyl phosphorodichloridite (14.70, 0.1 mole) in dry benzene (100 ml.) at room temperature is added dropwise with agitation a solution of 4-chlorophenol (9.41 g, 0.1 mole) and triethylamine (10.11 g., 0.1 mole) in 20 ml. dry benzene. The mixture is heated to reflux with agitation and maintained for an hour to complete the reaction. The reaction mixture is then filtered and the filtrate is evaporated. Fractional distillation of the residue at reduced pressure yields ethyl 4-chlorophenyl phosphorochloridite.

When phenol, benzyl alcohol, o,m or p-cresol, o,m or p-bromophenol is substituted for 4-chlorophenol, there is obtained the corresponding ethyl, phenyl, benzyl, o,m or p-methylphenyl, o,m or p-bromophenylphosphorochloridite.

EXAMPLE 6

Ethyl N-4-chlorophenylphosphoramidochloridite

To a solution of ethyl phosphorodichloridite (14.70 g., 0.1 mole) in dry benzene (100 ml.) at room temperature is added dropwise with agitation to a solution of 4-chloroaniline (25.52 g., 0.2 mole) in 20 ml. dry benzene. The resulting mixture is stirred at room temperature for approximately 2 hours filtered, and the filtrate evaporated. Fractional distillation of the residue at reduced pressure yields ethyl N-4-chlorophenylphosphoramidochloridite.

When methylamine, o,m or p-methoxybenzylamine, o,m or p-halobenzylamine, allylamine or dibutenylamine is substituted for 4-chloroaniline, there is obtained the corresponding ethyl N-methyl, o,m or p-methoxybenzyl, o,m or p- halobenzyl, allyl or dibutenylphosphoramidochloridite.

EXAMPLE 7
Tert-butyl
1-[4'-chlorophenyl(ethoxy)phosphinyl]-5-methoxy-2-methyl-3-indolylacetate 57% Sodium hydride oil dispersion (0.44 g., 10.5 m. mole) is added to a solution of tert-butyl 5-methoxy-2-methyl-3-indolylacetate (2.75 g., 10.0 m. mole) in dry dimethyl formamide (15 ml.) with stirring and at a rate to keep the temperature 35°–40°. The mixture is stirred at 40° for 15 minutes to complete anion formation, then cooled to room temperature and ethyl 4-chlorophenylphosphonochloridate (2.63 g., 11.0 m. mole) added at a rate to maintain a temperature not higher than 40°. Stirring is continued at room temperature for 24 hours in an atmosphere of dry nitrogen, then the solvent is removed in a rotary evaporator at 40°/0.1 mm. and the crude product purified by chromatography over silica gel, yields tert-butyl 1-[4'-chlorophenyl(ethoxy)phosphinyl]-5-methoxy-2-methyl-3-indolylacetate. When ethyl 2-fluorophenylphosphonochloridate, methyl 4-methylthiophenylphosphonochloridate,
isopropyl 4-chlorophenylphosphonochloridite
di-isopropyl phosphorochloridate
ethyl N,N-diethylphosphoramidochloridate
ethyl 4-chlorophenylphosphorochloridite
ethyl N-4-chlorophenylphosphoramidochloridite
diisopropyl phosphorochloridothionate or
N,N-dimethyl o-ethylphosphoramidochloridothionate
tert-butyl 1-[2'-fluorophenyl(ethoxy)phosphinyl]-5-methoxy-2-methyl-3-indolylacetate
tert-butyl 1-[4'-methylthiophenyl(ethoxy)phosphinyl]-5-methoxy-2-methyl-3-indolylacetate
tert-butyl isopropyl 1-[4'-chlorophenylphosphino]-5-methyl-3-indolylacetate,
tert-butyl 1-[diisopropoxyphosphinyl]-5-methoxy-2-methyl-3-indolylacetate,
tert-butyl 1-[N,N-diethylamino(ethoxy)phosphinyl]-5-methoxy-2-methyl-3-indolylacetate,
tert-butyl 1-[4'-chlorophenyl(ethoxy)phosphino]-5-methoxy-2-methyl-3-indolylacetate,
tert-butyl 1-[4'-chlorophenylamino(ethoxy)phosphino]-5-methoxy-2-methyl-3-indolylacetate
tert-butyl 1-[4'-chlorophenyl(ethoxy)phosphinothioyl]-5-methoy-2-methyl-3-indolylacetate
tert-butyl 1-dimethylamino(ethoxy)phosphinothioyl-5-methoxy-2-methyl-3-indolylacetate, respectively.

EXAMPLE 8

Benzyl
1-[4'-chlorophenyl(ethoxy)phosphinyl]-5-methoxy-2-methyl-3-indolylacetate 57% Sodium hydride oil dispersion (0.44 g., 10.5 m. mole) is added to a solution of benzyl 5-methoxy-2-methyl- 3-indolylacetate (3.09 g., 10.0 m. mole) in dry dimethyl formamide (15 ml.) with stirring and at a rate to keep the temperature 35°–40°. The mixture is stirred at 40° for 15 minutes to complete anion formation, then cooled to room temperature and ethyl 4-chlorophenylphosphonochloridate (2.63 g., 11.0 m. mole) added at a rate to maintain a temperature not higher than 40°. Stirring is continued at room temperature for 24 hours in an atmosphere of dry nitrogen, then the solvent was removed in a rotary evaporator at 40°/0.1 mm. and the crude product purified by chromatography over silica gel, yielding benzyl 1-[4'-chlorophenyl(ethoxy)phosphinyl]-5-methoxy-4-methoyl-3-indolylacetate.

When ethyl 2-fluorophenylphosphonochloridate
methyl 4-methylthiophenylphosphonochloridate
isopropyl 4-chlorophenylphosphonochloridite
diisopropyl phosphorochloridate
ethyl N,N-diethyl phosphoramidochloridate
ethyl 4-chlorophenylphosphorochloridite
ethyl N-4-chlorophenylphosphoramidochloridite
diisopropyl phosphorochloridothionate or
N,N-dimethyl o-ethyl phosphoramidochloridothionate is substituted for ethyl 4-chlorophenylphosphonochloridate, there is obtained:

benzyl 1-[2'-fluorophenyl(ethoxy)phosphinyl]-5-methoxy-2-methyl-3-indolylacetate
benzyl 1-[4'-methylthiophenyl(ethoxy)phosphinyl]-5-methoxy-2-methyl-3-indolylacetate
benzyl isopropyl 1-[4'-chlorophenylphosphino]-5-methoxy-2-methyl-3-indolylacetate
benzyl 1-[diisopropoxyphosphinyl]-5-methoxy-2-methyl-3-indolylacetate
benzyl 1-[N,N-diethylamino(ethoxy)phosphinyl]-5-methoxy-2-methyl-3-indolylacetate
benzyl 1-[4'-chlorophenyl(ethoxy)phosphino]-5-methoxy-2-methyl-3-indolylacetate
benzyl 1-[4'-chlorophenylamino(ethoxy)phosphino]-5-methoxy-2-methyl-3-indolylacetate
benzyl 1-[4'-chlorophenyl(ethoxy)phosphinothioyl]-5-methoxy-2-methyl-3indolylacetate
benzyl 1-dimethylamino(ethoxy)phosphinothioyl-5-methoxy-2-methyl-3-indolylacetate, respectively.

EXAMPLE 9

The procedure of example 7 is repeated except that the starting material is tert-butyl-5-methoxy-2-methyl-3-indolylpropionate
tert-butyl-5-fluoro-2-methyl-3-indolylacetate
tert-butyl-6-chloro-2-methyl-3-indolylacetate
tert-butyl 6-chloro-5-methoxy-2-methyl-3-indolylacetate
tert-butyl-2-methyl-5-dimethylamino-3-indolylacetate
tert-butyl-2-methyl-5-(1-pyrrolidino)-3-indolylacetate
tert-butyl-2-methyl-5-fluoro-3-indolylacetate
tert-butyl-2-methyl-5-cyano-3-indolylacetate
tert-butyl-2-methyl-5-propenyl-3-indolylacetate or
tert-butyl-2-methyl-5-nitro-3-indolylacetate, is substituted for tert-butyl-5-methyl-2-methyl-3-indolylacetate. Using the same reaction and conditions, there is obtained:

tert-butyl-1[4'-chlorophenyl(ethoxy)phosphinyl]-5-methoxy-2-methyl-3-indolypropionate
tert-butyl-1[4'-chlorophenyl(ethoxy)phosphinyl]-5-fluoro-2-methyl-3-indolylacetate
tert-butyl-1[4'-chlorophenyl(ethoxy)phosphinyl]-6-chloro-2-methyl-3-indolylacetate
tert-butyl-1-[4'-chlorophenyl(ethoxy)phosphinyl]-6-chloro-5-methoxy-2-methyl-3-indolylacetate tert-butyl-1-[4'-chlorophenyl(ethoxy)phosphinyl]-2-methyl-5-dimethylamino-3-indolylacetate tert-butyl-1[4'-chlorophenyl(ethoxy)phosphinyl]-2-methyl-5-(1-pyrrolidino)-3-indolylacetate tert-butyl-1-[4'-chlorophenyl(ethoxy)phosphinyl]-2-methyl-5-fluoro-3-indolylacetate tert-butyl-1-[4'-chlorophenyl(ethoxy)phosphinyl]-2-methyl-5-cyano-3-indolylacetate tert-butyl-1-[4'-chlorophenyl(ethoxy)phosphinyl]-2-methyl-5-propenyl-3-indolylacetate or tert-butyl-1-[4'-chlorophenyl(ethoxy)phosphinyl]-2-methyl-5-nitro-3-indolylacetate.

EXAMPLE 10

1-[4'-chlorophenyl(hydroxy)phosphinyl]-5-methoxy-2-methylindolyl-3-acetic acid mono sodium salt

A.

Tert-butyl-1-[chlorophenyl(hydroxy)phosphinyl]-5-methoxy-2-methyl-3-indolylacetate mono sodium salt Tert-butyl-1-[4'-chlorophenyl(ethoxy)phosphinyl]-5-methoxy-2-methyl-3-indolylacetate, (2.39 g. 50.0 m. mole) is dissolved in a hot solution of dried sodium iodide (0.75 g. 5.0 m. mole) in freshly distilled methylethyl ketone (25 ml.) The solution is stirred and heated under reflux in a dry nitrogen atmosphere for 3 hours, thus forming a precipitate of the desired product. Filration, washing with acetone and drying in vacuo yeilds tert-butyl-1-[4'-chlorophenyl(hydroxy)phosphinyl]-5-methoxy-2-methyl-3-indolylacetate sodium salt.

B.

1-[4'-chlorophenyl(hydroxy)phosphinyl]-5-methoxy-2-methyl-3-indolylacetic acid mono sodium salt The above salt (1.0 g) in an atmosphere of dry nitrogen is disspived in anhydrous trifluoroacetic acid (20 ml.) at 0°, and left at this temperature overnight (15 hours). The solvent is evaporated 0°/ reduced pressure eaving 1-[4'-chlorophenyl(hydroxy)phosphinyl]-5-methoxy-2-3-indolylacetic acid mono sodium salt.

When potassium halide is substituted for sodium iodide in step (A) above, there is obtained tert-butyl-1-4'-chlorophenyl(hydroxy)phosphinyl]-5-methoxy-2-methyl-3-indolylacetate potassium salt, which may similarly be cleaved as in step (B) above to yield 1-[4'-hlorophenyl(hydroxy)phosphinyl]-5-methoxy-2-methyl-3-indolylacetic acid mono potassium salt.

EXAMPLE 11

1-[4'-chlorophenyl(ethoxy)phosphinyl]-5-methoxy-2-methyl-3-indolylacetic acid

A solution of benzyl 1-[4'-chlorophenyl(ethoxy)-hosphinyl]-5-methoxy-2-methyl-3-indolylacetate 4.00 g.) in methanol (50 ml.) is hydrogenated at 40 )./in² with 10% Ruthenium on carbon catalyst until 1 quivalent of hydrogen is absorbed. The mixture is filered through supercel and evaporated under reduced ressure to yield 1-[4'-hlorophenyl(ethoxy)phosphinyl]-5-methoxy-2-ethyl-3-indolylacetic acid.
When enzyl 1-[2'-fluorophenyl(ethoxy)phosphinyl]-5-methoxy-2-methyl-3-indolyl acetate enzyl 1-[4'-methylthiophenyl(ethoxy)phosphinyl]-5-methoxy-2-methyl-3-indolylacetate benzyl 1-[4'-chlorophenyl(isopropoxy)phosphino]-5-methoxy-2-methyl-3-indolylacetate benzyl 1-[diisopropoxyphosphinyl]-5-methoxy-2-methyl-3-indolylacetate benzyl 1-[N,N-diethylamino(0-ethyl)phosphinyl]-5-methoxy-2-methyl-2-indolylacetate or benzyl-1-[4'-chlorophenyl(ethoxy)phosphino]-5-methoxy-2-methyl-3-indolylacetate is substituted for benzyl 1-[4'-chlorophenyl(ethoxy)phosphinyl]-5-methoxy-2-methyl-3-indolylacetate there is obtained 1-[2'-fluorophenyl(ethoxy)phosphinyl]-5-methoxy-2-methyl-3-indolylacetic acid 1-[4'-methylthiophenyl(ethoxy)phosphinyl]-5-methoxy-2-methyl-3-indolylacetic acid 1-[4'-chlorophenyl(isopropoxy)phosphino]-5-methoxy-2-methyl-3-indolylacetic acid 1-[diisopropoxyphosphinyl]-5-methyl-2-methyl-3-indolylacetic acid 1-[N,N-diethylamino(0-ethyl)phosphinyl]-5-methoxy-2-methyl-3-indolylacetic acid or 1-[4'-chlorophenyl(ethoxy)phosphino]-5-methoxy-2-methyl-3-indolylacetic acid.

EXAMPLE 12

1-[4'-chlorophenyl(hydroxy)phosphinyl]-5-methoxy-2-methyl-3-indolylacetic acid mono sodium salt 1-[4-Chlorophenyl(ethoxy)phosphinyl]-5-methoxy-2-methyl-3-indolylacetic acid (2.11 g., 5.0 m. mole) is dissolved in a hot solution of dried sodium iodide (0.75 g., 5.0 m. mole) in freshly distilled methyl ethyl ketone (25 ml.). The solution is stirred and boiled under reflux in an atmosphere of dry nitrogen for 3 hours forming a precipitate of the product. Filtration, washing with acetone and drying in vacuo yields 1-[4'-chlorophenyl(hydroxy)phosphinyl]-5-methoxy-2-methyl-3-indolylacetic acid mono sodium salt. When:

1-[4'-chlorophenyl(ethoxy)phosphinyl]-2-methyl-5-methoxy-6-chloroindolyl-3-acetic acid 1-[4'-chlorophenyl(ethoxy)phosphinyl]-2-methyl-5-methylindolyl-3-acetic acid 1-[4'-chlorophenyl(ethoxy)phosphinyl]-2-methyl-5-nitroindolyl-3-acetic acid 1-[4'-chlorophenyl(ethoxy)phosphinyl-2-methyl-5-dimethylaminoindolyl-3-acetic acid 1-[0-ethyl(N,N-diethyl(amino)phosphinyl]-2-methyl-5-dimethylaminoindolyl-3-acetic acid 1-[4'-chlorophenyl(ethoxy)phosphinyl]-2-methyl-5-(1-pyrrolidino)indolyl-3-acetic acid 1-[4'-chlorophenyl(ethoxy)phosphinyl]-2-methyl-5-fluoroindolyl-3-acetic acid 1-[4'-chlorophenyl(ethoxy)phosphinyl]-2-methyl-5-acetylindolyl-3-acetic acid 1-[4'-chlorophenyl(ethoxy)phosphinyl]-2-methyl-5-cyanoindolyl-3-acetic acid 1-[4'-chlorophenyl(ethoxy)phosphinyl]-2-methyl-5-propenylindolyl]-2-acetic acid 1-[4'-chlorophenyl(ethoxy)phosphino]-2-methyl-5-methylindolyl-3-acetic acid 1-[4'-chlorophenyl(ethoxy)phosphino]-2-methyl-5-nitroindolyl-3-acetic acid 1-[di-isopropoxy phosphino]-2-methyl-5-nitroindolyl-3-acetic acid 1-[4'-chlorophenyl(ethoxy)phosphino]-2-methyl-5-dimethylaminoindolyl-3-acetic acid
1-[4'-chlorophenyl(ethoxy)phosphino]-2-methyl-5-(1-pyrrolidino)indolyl-3-acetic acid
1-[4'-chlorophenyl(ethoxy)phosphino]-2-methyl-5-fluoroindolyl-3-acetic acid
1-[4'-chlorophenyl(ethoxy)phosphino]-2-methyl-5-acetylindolyl-3-acetic acid
1-[4'-chlorophenyl(ethoxy)phosphino]-2-methyl-5-propenylindolyl-3-acetic acid
1-[4'-chlorophenyl(ethoxy)phosphinothioyl]-2-methyl-5-methoxyindolyl-3-acetic acid
1-[4'-chlorophenyl(ethoxy)phosphinothioyl]-2-methyl-5-nitroindolyl-3-acetic acid
1-[4'-chlorophenyl(ethoxy)phosphinothioyl]-2-methyl-5-dimethylaminoindolyl-3-acetic acid
1-[0-ethyl(N,N,-diethyl(amino)phosphinothioyl]-2-methyl-5-dimethylaminoindolyl-3-acetic acid
1[4'-chlorophenyl(ethoxy)phosphinothioyl]-2-methyl-5-(1-pyrrolidino)indolyl-3-acetic acid
1-[4'-chlorophenyl(ethoxy)phosphinothioyl]-2-methyl-5-fluoroindolyl-3-acetic acid
1-[4'-chlorophenyl(ethoxy)phosphinothioyl]-2-methyl-5-acetylindolyl-3-acetic acid
1-[4'-chlorophenyl(ethoxy)phosphinothioyl]-2-methyl-5-cyanoindolyl-3-acetic acid
1-[4'-chlorophenyl(ethoxy)phosphinothioyl]-2-methyl-5-propenylindolyl-3-acetic acid
1-[3'-chlorophenyl(ethoxy)phosphinyl]-2-methyl-5-methoxyindolyl-3-acetic acid
1-[4'-morpholino(methoxy)phosphino]-2-methyl-5-methoxyindolyl-3-acetic acid
1-[4'-morpholino(methoxy)phosphino]-2-methyl-5-dimethylaminoindolyl-3-acetic acid
1-[4'-morpholino(methoxy)phosphino]-2-methyl-5-fluoroindolyl-3-acetic acid or
1-[4'-chlorophenyl(ethoxy)phosphinothioyl]-2-methyl-5-methoxy-3-indolylacetic acid
is substituted for 1-[4'-chlorophenyl(hydroxy)phosphinyl]-5-methoxy-2-methyl-3-indolylacetic acid, there is obtained:

1-[4'-chlorophenyl(hydroxy)phosphinyl]-2-methyl-5-methoxy-6-chloroindolyl-3-acetic acid mono-sodium salt
1-[4'-chlorophenyl(hydroxy)phosphinyl]-2-methyl-5-methylindolyl-3-acetic acid mono-sodium salt
1-[4'-chlorophenyl(hydroxy)phosphinyl]-2-methyl-5-nitroindolyl-3-acetic acid mono-sodium salt
1-[4'-chlorophenyl(hydroxy)phosphinyl]-2-methyl-5-dimethylaminoindolyl-3-acetic acid mono-sodium salt
1-[N,N-diethylamino(hydroxy)phosphinyl]-2-methyl-5-dimethylaminoindolyl-3-acetic acid mono sodium slt
1-[4'-chlorophenyl(hydroxy)phosphinyl]-2-methyl-5-(1-pyrrolidino)indolyl-3-acetic acid mono sodium salt
1-[4'-chlorophenyl(hydroxy)phosphinyl]-2-methyl-5-fluoroindolyl-3-acetic acid mono-sodium salt
1-[4'-chlorophenyl(hydroxy)phosphinyl]-2-methyl-5-acetylindolyl-3-acetic acid mono-sodium salt
1-[4'-chlorophenyl(hydroxy)phosphinyl]-2-methyl-5-cyanoindolyl-3-acetic acid mono-sodium salt
1-[4'-chlorophenyl(hydroxy)phosphinyl]-2-methyl-5-propenylindolyl-3-acetic acid mono-sodium salt
1-[4'-chlorophenyl(hydroxy)phosphino]-2-methyl-5-methylindolyl-3-acetic acid mono-sodium salt
1-[4'-chlorophenyl(hydroxy)phosphino]-2-methyl-5-nitroindolyl-3-acetic acid mono-sodium salt
1-[hydroxy(isopropoxy)phosphino]-2-methyl-5-nitroindolyl-3-acetic acid mono-sodium salt
1-[4'-chlorophenyl(hydroxy)phosphino]-2-methyl-5-dimethylaminoindolyl-3-acetic acid mono-sodium salt
11[4'-chlorophenyl(hydroxy)phosphino]-2-methyl-5-(1-pyrrolidino)indolyl-3-acetic acid mono-sodium salt
1-[4'-chlorophenyl(hydroxy)phosphino]-2-methyl-5-fluoroindolyl-3-acetic acid mono-sodium salt
1-[4'-chlorophenyl(hydroxy)phosphino]-2-methyl-5-acetylindolyl-3-acetic acid mono-sodium salt
1-[4'-chlorophenyl(hydroxy)phosphino]-2-methyl-5-propenylindolyl-3-acetic acid mono-sodium salt
1-[4'-chlorophenyl(hydroxy)phosphinothioyl]-2-methyl-5-methoxyindolyl-3-acetic acid mono-sodium salt
1-[4'-chlorophenyl(hydroxy)phosphinothioyl]-2-methyl-5-nitroindolyl-3-acetic acid mono-sodium salt
1-[4'-chlorophenyl(hydroxy)phosphinothioyl]-2-methyl-5-dimethylaminoindolyl-3-acetic acid mono-sodium salt
1-[N,N-diethylamino(hydroxy)phosphinothioyl]-2-methyl-5-dimethylaminoindolyl-3-acetic acid mono-sodium salt
1-[4'-chlorophenyl(hydroxy)phosphinothioyl]-2-methyl-5-(1-pyrrolidino)indolyl-3-acetic acid mono-sodium salt
1-[4'-chlorophenyl(hydroxy)phosphinoethioyl]-2-methyl-5-fluoroindolyl-3-acetic acid mono-sodium salt
1-[4'-chlorophenyl(hydroxy)phosphinothioyl]-2-methyl-5-acetylindolyl-3-acetic acid mono-sodium salt
1-[4'-chlorophenyl(hydroxy)phosphinothioyl]-2-methyl-5-cyanoindolyl-3-acetic acid mono-sodium salt
1-[4'-chlorophenyl(hydroxy)phosphinothioyl]-2-methyl-5-propenylindolyl-3-acetic acid mono-sodium salt
1-[3'-chlorophenyl(hydroxy)phosphinyl]-2-methyl-5-methoxyindolyl-3-acetic acid mono-sodium salt
1-[4'-morpholino(hydroxy)phosphino]-2-methyl-5-methoxyindolyl-3-acetic acid mono-sodium salt
1-[4'-morpholino(hydroxy)phosphino]-2-methyl-5-dimethylaminoindolyl-3-acetic acid mono-sodium salt
1-[4'-morpholino(hydroxy)phosphino]-2-methyl-5-fluoroindolyl-3-acetic acid mono-sodium salt or
1-[4'-chlorophenyl(hydroxy)phosphinothioyl]-2-methyl-5-methoxy-3-indolyl acetic acid mono-sodium salt, respectively.

EXAMPLE 13

1-[4'-chlorophenyl(hydroxy)phosphinyl]-5-methoxy-2-methyl-3-indolylacetic acid di-sodium salt 1-[4'-Chlorophenyl(hydroxy)phosphinyl]-5-methoxy-2-methyl-3-indolylacetic acid mono-sodium salt (20.5 g., 5.0 m. mole) is treated with 5.0 ml. of aqueous N sodium hydroxide at room temperature and stirred for approximately ten (10) minutes. The resulting solution is then evaporated to a residue under reduced pressure to yield the product, 1-[4'-chlorophenyl(hydroxy)phosphinyl]-5-methoxy-2-methyl-3-indolylacetic acid di-sodium salt.

When,

1-[4'-chlorophenyl(hydroxy)phosphinyl]-2-methyl-5-methoxy-6-chloroindolyl-3-acetic acid mono-sodium salt
1-[4'-chlorophenyl(hydroxy)phosphinyl]-2-methyl-5-methylindolyl-3-acetic acid mono-sodium salt
1-[4'-chlorophenyl(hydroxy)phosphinyl]-2-methyl-5-nitroindolyl-3-acetic acid mono-sodium salt
1-[4'-chlorophenyl(hydroxy)phosphinyl]-2-methyl-5-dimethylaminoindolyl-3-acetic acid mono-sodium salt
1-[N,N-diethylamino(hydroxy)phosphinyl]-2-methyl-5-dimethylaminoindolyl-3-acetic acid mono-sodium salt
1-[4'-chlorophenyl(hydroxy)phosphinyl]-2-methyl-5-(1-pyrrolidino)indolyl-3-acetic acid mono-sodium salt
1-[4'-chlorophenyl(hydroxy)phosphinyl]-2-methyl-5-fluoroindolyl-3-acetic acid mono-sodium salt
1-[4'-chlorophenyl(hydroxy)phosphinyl]-2-methyl-5-acetylindolyl-3-acetic acid mono-sodium salt
1-[4'-chlorophenyl(hydroxy)phosphinyl]-2-methyl-5-cyanoindolyl-3-acetic acid mono-sodium salt
1-[4'-chlorophenyl(hydroxy)phosphinyl]-2-methyl-5-propenylindolyl-3-acetic acid mono-sodium salt
1-[4'-chlorophenyl(hydroxy)phosphino]-2-methyl-5-methylindolyl-3-acetic acid mono-sodium salt
1-[4'-chlorophenyl(hydroxy)phosphino]-2-methyl-5-nitroindolyl-3-acetic acid mono-sodium salt
1-[hydroxy(isopropxy)phosphino]-2-methyl-5-nitroindolyl-3-acetic acid mono-sodium salt
1-[4'-chlorophenyl(hydroxy)phosphino]-2-methyl-5-dimethylaminoindolyl-3-acetic acid mono-sodium salt
1-[4'-chlorophenyl(hydroxy)phosphino]-2-methyl-5-(1-pyrrolidino)indolyl-3-acetic acid mono-sodium salt
1-[4'-chlorophenyl(hydroxy)phosphino]-2-methyl-5-fluoroindolyl-3-acetic acid mono-sodium salt
1-[4'-chlorophenyl(hydroxy)phosphino]-2-methyl-5-acetylindolyl-3-acetic acid mono-sodium salt
1-[4'-chlorophenyl(hydroxy)phosphino]-2-methyl-5-propenylindolyl-3-acetic acid mono-sodium salt
1-[4'-chlorophenyl(hydroxy)phosphinothioyl]-2-methyl-5-methoxyindolyl-3-acetic acid mono-sodium salt
1-[4'-chlorophenyl(hydroxy)phosphinothioyl]-2-methyl-5-nitroindolyl-3-acetic acid mono-sodium salt
1-[4'-chlorophenyl(hydroxy)phosphinothioyl]-2-methyl-5-dimethylaminoindolyl-3-acetic acid mono-sodium salt
-[N,N-diethylamino(hydroxy)phosphinothioyl]-2-methyl-5-dimethylaminoindolyl-3-acetic acid mono-sodium salt
-[4'-chlorophenyl(hydroxy)phosphinothioyl]-2-methyl-5-(1-pyrrolidino)indolyl-3-acetic acid mono-sodium salt
-[4'-chlorophenyl(hydroxy)phosphinothioyl]-2-methyl-5-fluoroindolyl-3-acetic acid mono-sodium salt
1-[4'-chlorophenyl(hydroxy)phosphinothioyl]-2-methyl-5-acetylindolyl-3-acetic acid mono-sodium salt
1-[4'-chlorophenyl(hydroxy)phosphinothioyl]-2-methyl-5-cyanoindolyl-3-acetic acid mono-sodium salt
1-[4'-chlorophenyl(hydroxy)phosphinothioyl]-2-methyl-5-propenylindolyl-3-acetic acid mono-sodium salt
1-[3'-chlorophenyl(hydroxy)phosphinyl]-2-methyl-5-methoxyindolyl-3-acetic acid mono-sodium salt
1-[4'-morpholino(hydroxy)phosphino]-2-methyl-5-methoxyindolyl-3-acetic acid mono-sodium salt
1-[4'-morpholino(hydroxy)phosphino]-2-methyl-5-dimethylaminoindolyl-3-acetic acid mono-sodium salt
1-[4'-morpholino(hydroxy)phosphino]-2-methyl-5-fluoroindolyl-3-acetic acid mono-sodium salt, or
11[4'-chlorophenyl(hydroxy)phosphinothioyl]-2-methyl-5-methoxy-3-indolyl acetic acid mono-sodium salt, is substituted for 1-[4'-chlorophenyl(hydroxy)phosphinyl]-5-methoxy-2-methyl-3-indolylacetic acid mono-sodium salt, there is obtained, 1-[4'-chlorophenyl(hydroxy)phosphinyl]-2-methyl-5-methoxy-6-chloroindolyl-3-acetic acid di-sodium salt
1-[4'-chlorophenyl(hydroxy)phosphinyl]-2-methyl-5-methylindolyl-3-acetic acid di-sodium salt
1-[4'-chlorophenyl(hydroxy)phosphinyl]-2-methyl-5-nitroindolyl-3-acetic acid di-sodium salt
1-[4'-chlorophenyl(hydroxy)phosphinyl]-2-methyl-5-dimethylaminoindolyl-3-acetic acid di-sodium salt
1-[N,N-diethylamino(hydroxy)phosphinyl]-2-methyl-5-dimethylaminoindolyl-3-acetic acid di-sodium salt
1-[4'-chlorophenyl(hydroxy)phosphinyl]-2-methyl-5-(1-pyrrolidino)indolyl-3-acetic acid di-sodium salt
1-[4'-chlorophenyl(hydroxy)phosphinyl]-2-methyl-5-fluoroindolyl]-2-acetic acid di-sodium salt
1-[4'-chlorophenyl(hydroxy)phosphinyl]-2-methyl-5-acetylindolyl-3-acetic acid di-sodium salt
1-[4'-chlorophenyl(hydroxy)phosphinyl]-2-methyl-5-cyanoindolyl-3-acetic acid di-sodium salt
1-[4'-chlorophenyl(hydroxy)phosphinyl]-2-methyl-5-propenylindolyl-3-acetic acid di-sodium salt
1-[4'-chlorophenyl(hydroxy)phosphino]-2-methyl-5-methylindolyl-3-acetic acid di-sodium salt
1-[4'-chlorophenyl(hydroxy)phosphino]-2-methyl-5-nitroindolyl-3-acetic acid di-sodium salt
1-[hydroxy(isopropoxy)phosphino]-2-methyl-5-nitroindolyl-3-acetic acid di-sodium salt
1-[4'-chlorophenyl(hydroxy)phosphino]-2-methyl-5-dimethylaminoindolyl-3-acetic acid di-sodium salt
1-[4'-chlorophenyl(hydroxy)phosphino]-2-methyl-5-(1-pyrrolidino)indolyl-3-acetic acid di-sodium salt
1-[4'-chlorophenyl(hydroxy)phosphino]-2-methyl-5-fluoroindolyl-3-acetic acid di-sodium salt
1-[4'-chlorophenyl(hydroxy)phosphino]-2-methyl-5-acetylindolyl-3-acetic acid di-sodium salt
1-[4'-chlorophenyl(hydroxy)phosphino]-2-methyl-5-propenylindolyl-3-acetic acid di-sodium salt
1-[4'-chlorophenyl(hydroxy)phosphinothioyl]-2-methyl-5-methoxyindolyl-3-acetic acid di-sodium salt 1-[4'-chlorophenyl(hydroxy)phosphinothioyl]-2-methyl-5-nitroindolyl-3-acetic acid di-sodium salt 1-[4'-chlorophenyl(hydroxy)phosphinothioyl]-2-methyl-5-dimethylaminoindolyl-3-acetic acid di-sodium salt 1-[N,N-diethylamino(hydroxy)phosphinothioyl]-2-methyl-5-dimethylaminoindolyl-3-acetic acid di-sodium salt 1-[4'-chlorophenyl(hydroxy)phosphinothioyl]-2-methyl-5-(1-pyrrolidino)indolyl-3-acetic acid di-sodium salt 1-[4'-chlorophenyl(hydroxy)phosphinothioyl]-2-methyl-5-fluoroindolyl-3-acetic acid di-sodium salt 1-[4'-chlorophenyl(hydroxy)phosphinothioyl]-2-methyl-5-acetylindolyl-3-acetic acid di-sodium salt 1-[4'-chlorophenyl(hydroxy)phosphinothioyl]-2-methyl-5-cyanoindolyl-3-acetic acid di-sodium salt 1-[4'-chlorophenyl(hydroxy)phosphinothioyl]-2-methyl-5-propenylindolyl-3-acetic acid di-sodium salt 1-[3'-chlorophenyl(hydroxy)phosphinyl]-2-methyl-5-methoxyindolyl-3-acetic acid di-sodium salt 1-[4'-morpholino(hydroxy)phosphino]-2-methyl-5-methoxyindolyl-3-acetic acid di-sodium salt 1-[4'-morpholino(hydroxy)phosphino]-2-methyl-5-dimethylaminoindolyl-3-acetic acid di-sodium salt 1-[4'-morpholino(hydroxy)phosphino]-2-methyl-5-fluoroindolyl-3-acetic acid di-sodium salt, or 1-[4'-chlorophenyl(hydroxy)phosphinothioyl]-2-methyl-5-methoxy-3-indolyl acetic acid di-sodium salt, respectively.

EXAMPLE 14

Tert-butyl 1-diisopropoxyphosphinothioyl-5-methoxy-2-methyl-3-indolylacetate

57% Sodium hydroxide oil dispersion (0.44 g., 10.5 m. mole) is added to a solution of tert-butyl 5-methoxy-2-methyl-3-indolylacetate (2.75 g., 10.0 m. mole) in dry dimethyl formamide (15 ml.) with stirring and at a rate to keep the temperature 35°-40°. The mixture is stirred at 40° for 15 minutes to complete anion formation, then cooled to room temperature and ethyl 4-chlorophenylphosphonochloridothionate (2.81 g., 11.0 m. mole) added at a rate to maintain a temperature not higher than 40°. Stirring is continued at room temperature for 24 hours in an atmosphere of dry nitrogen, then the solvent is removed in a rotary evaporator at 40°/0.1 mm. and the crude product purified by chromatography over silica gel, yielding tert-butyl 1-diisopropoxyphosphinothioyl-5-methoxy-2-methyl-3-indolylacetate.

I claim:
1. A compound of formula

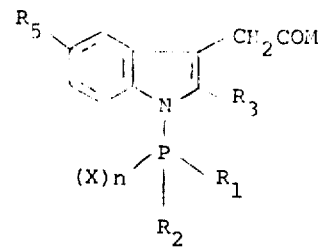

wherein $R_1$ is alkoxy, $R_2$ is haloaryl, $R_3$ is alkyl, $R_5$ is alkoxy, M is hydroxy, X is oxygen, and $n$ is 1.

2. The compound of claim 1 wherein $R_1$ is ethoxy, $R_2$ is chlorophenyl, $R_3$ is methyl, and $R_5$ is methoxy.

3. A compound of formula

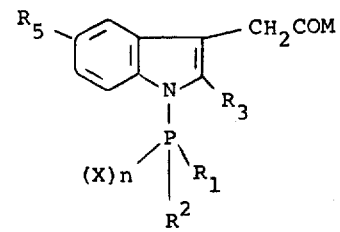

wherein $R_1$ is alkoxy, $R_2$ is haloaryl, $R_3$ is alkyl, $R_5$ is alkoxy, M is hydroxy, X is sulfur and $n$ is 1.

4. The compound of claim 3 wherein $R_1$ is ethoxy, $R_2$ is chlorophenyl, $R_3$ is methyl and $R_5$ is methoxy.

5. A compound of formula:

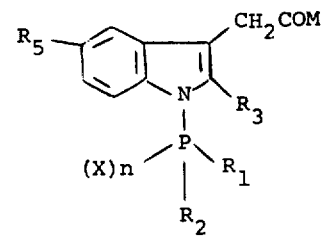

wherein $R_1$ is alkoxy, $R_2$ is haloaryl, $R_3$ is alkyl, $R_5$ is alkoxy, M is hydroxy, and $n$ is 0.

6. The compound of claim 5 wherein $R_1$ is ethoxy, $R_2$ is chlorophenyl, $R_3$ is methyl and $R_5$ is methoxy.

* * * * *